(12) United States Patent
Lassota (10) Patent No.: US 7,717,026 B1
(45) Date of Patent: May 18, 2010

(54) MULTICONTROLLED BREWER FOR OPTIMUM FLAVOR EXTRACTION

(75) Inventor: Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 374 days.

(21) Appl. No.: 10/850,731

(22) Filed: May 21, 2004

Related U.S. Application Data

(60) Provisional application No. 60/474,088, filed on May 28, 2003.

(51) Int. Cl.
*A47J 31/40* (2006.01)

(52) U.S. Cl. .............................. 99/283; 99/299; 99/305

(58) Field of Classification Search .................... 99/299, 99/283, 285, 305, 302 R, 307; 356/410, 356/434, 436
See application file for complete search history.

(56) References Cited

U.S. PATENT DOCUMENTS

| | | | | |
|---|---|---|---|---|
| 2,502,844 | A * | 4/1950 | Hildreth | 99/282 |
| 3,423,209 | A * | 1/1969 | Weber | 426/433 |
| 3,773,424 | A * | 11/1973 | Selgin | 356/410 |
| 5,337,652 | A * | 8/1994 | Fischer et al. | 99/282 |
| 5,724,882 | A * | 3/1998 | Gallas et al. | 99/285 |
| 6,228,410 | B1 * | 5/2001 | Zajac et al. | 426/433 |
| 6,279,461 | B1 * | 8/2001 | Fukushima et al. | 99/299 |
| 6,526,872 | B2 * | 3/2003 | Wong | 99/282 |

* cited by examiner

*Primary Examiner*—Reginald L Alexander
(74) *Attorney, Agent, or Firm*—James W. Potthast; Potthast & Associates (57) ABSTRACT

A multicontrolled, fresh beverage brewer (20) with a dispense manifold heater (104) for selectively instantaneously heating pre-heated hot water from a hot water tank (29) immediately before the preheated hot water is dispensed into the brew basket (49) in sensed temperature of the beverage within the brew basket the preheated water immediately prior to being added to the brew basket, a photosensor (106) for sensing a level of light conductance of the beverage for controlling at least one of a brew dispense valve (37), a bypass valve (38) and a brew basket drain hole closure (94) in response to photosensor sensing a level of light conductance level of the beverage, and brew basket pressurization system (50, 69, 51) for selectively pressurizing the brew basket (49) to selectively accelerate the flow rate of hot water though an ingredient within the brew basket. A rotary spray head drive (110) rotates a rotating spray assembly to provide an even distribution of hot water over the surface of the ingredient, and a spray distribution plate employs open channels of differing length (156) to channel the water to different desired location are open for easy cleaning and elimination of clogging from lime residue. A brew basket filter holder (72) insert for insertion into the filter holder has a cylindrical, water impervious wall to prevent side passage of the hot water through the layer of beverage ingredient.

38 Claims, 10 Drawing Sheets

MULTICONTROLLED BREWER FOR OPTIMUM FLAVOR EXTRACTION

CROSS-REFERENCE TO RELATED APPLICATION

This application claims the benefit under 35 USC 119(e) of U.S. provisional patent application of the present inventor, Ser. No. 60/474,088 filed May 28, 2003, which is hereby incorporated by reference.

SUMMARY OF THE INVENTION

1. Field of the Invention

This invention relates generally to hot beverage makers and more particularly to hot beverage brewers that brew fresh beverage by passing hot water through a beverage ingredient contained within a brew basket with a beverage drain hole.

2. Discussion of the Prior Art

Beverage brewers of the type having a hot water dispense system for passing hot water through a beverage ingredient, such as ground coffee or tea, or tea leaves, or the like, while held within a paper filter which in turn is held within a brew basket are well know and will be described in greater detail below with reference to FIG. 1. While such known brewers function successfully, they sometimes fail to obtain maximum extraction and optimum flavor due to an inability to fully control brew parameters depending upon changing conditions such as room temperature, inherent percolation rates at atmospheric pressure, seepage of water out the sides of the layer of ingredient and not through the entire layer, or due to a failure to provide a uniform distribution of hot water onto the top surface of the ingredient. Accordingly, the inventor has determined that there is a need to overcome these short comings.

SUMMARY

It is therefore an object of the present invention to overcome these disadvantages of know beverage brewers noted above.

This objective is achieved in part by providing a hot beverage brewer having a source of hot water, a brew basket assembly for holding beverage ingredient, a water dispense system for selectively passing hot water into the brew basket assembly under control of an electronic controller with a brew basket control system composed of a pressure source, means for selectively applying positive air pressure from the pressure source to the brew basket, and means for controlling the application of pressure to the brew basket by the selectively applying means to control the rate of seepage of hot water through a layer of beverage ingredient within the brew basket.

Preferably, the controlling means includes means for sensing pressure, and the pressure controlling means includes means responsive to the pressure sensing means for controlling the application of pressure by the selectively applying means to the brew basket. The controlling means preferably includes means for timing the brew cycle and selectively applying pressure to the brew basket assembly at preselected times during the brewing cycle to speed the rate at which the water percolates though the beverage ingredient during preselected time periods during the brew cycle in order to maximize uniform extraction and optimum flavor. Also, in the preferred embodiment the selectively applying means includes a special dispense head assembly with a manifold with an inlet and an outlet that communicates directly with an open top brew basket assembly, and a solenoid controlled pressure valve with at least one outlet in pressure communication with the brew basket assembly. The pressure source includes an electrically powered pneumatic pump, and the controlling means includes means for controlling the application of power to the pneumatic pump. The brew basket assembly has a bottom with a beverage drain hole, or opening, and in the preferred embodiment a closure gate carried by the bottom and is mounted to the bottom by mounting members for sliding movement between a closed position and an open position.

The objective is also obtained by providing a hot beverage brewer having a source of hot water, a brew basket assembly for holding beverage ingredient, a water dispense system for selectively passing hot water into the brew basket assembly with a beverage drain hole under control of an electronic controller with a brew basket flow rate control system having means for selectively closing the beverage drain hole to accumulate beverage within the brew basket assembly during preselected time periods of a brew cycle to reduce the rate of flow of beverage from the drain hole, and means for selectively applying positive air pressure to the brew basket assembly during preselected time periods of the brew cycle to increase the rate of beverage flow from the brew basket assembly drain hole.

Moreover, the object of the invention is acquired by providing a hot beverage brewer having a source of hot water, a brew basket assembly for holding beverage ingredient and a drain hole to dispense beverage, a water dispense system for selectively passing hot water into the brew basket assembly, with a brew basket control system having means for electronically measuring a light characteristic of the beverage as the beverage flows downwardly out of the drain hole and falls freely through air to detect an indication of an instantaneous level of extraction of ingredient into the beverage prior to being mixed in the beverage container, said light measuring mean being located adjacent the drain hole and above the beverage container; said brew basket being removably mounted to the brewer and the light measuring means being spaced from the brew basket and the beverage container to enable removal of the brew basket without first disconnecting the light measuring means form the brew basket, and a controller responsive to the indication of the instantaneous level of extraction to control a hot water brew dispense valve for changing the rate of flow of the hot water onto the ingredient in the brew basket.

The objective is also partly acquired by providing a hot beverage brewer having a source of hot water, a brew basket assembly for holding beverage ingredient and a drain hole to dispense beverage into a beverage container, a water dispense system for selectively passing hot water into the brew basket assembly, with a brew basket control system, having means for electronically measuring a light characteristic of the beverage as it flows downwardly out of the drain hole to detect an indication of an instantaneous level of extraction of ingredient into the beverage, said light measuring means being located adjacent the drain hole and above the sewing container, and a controller responsive to the indication of the instantaneous level of extraction to control at least one of (a) a hot water brew dispense valve, (b) a bypass valve for passing hot water into the brew basket at a location spaced from the ingredient, (c) means to pressurize the brew basket to hasten draining of the beverage from the drain hole, and (d) an instantaneous electric hot water heater for heating hot water spaced from the hot water tank just before the hot water is dispensed into the brew basket; and in which the controller is responsive to the indication of the instantaneous level of extraction to control a drain hole closure means or is responsive to control the means to pressurize the brew basket to change the pressure within the brew basket.

The objective is also obtained in part by provision in a hot beverage brewer having a source of hot water, a brew basket assembly for holding beverage ingredient and a drain hole to dispense beverage, a water dispense system for selectively passing hot water into the brew basket assembly, the improvement being a brew basket control system with means for electronically measuring a light characteristic of the beverage as it flows downwardly out of the drain hole to detect an indication of an instantaneous level of extraction of ingredient into the beverage, said light measuring means being located adjacent the drain hole and above the beverage container, and a controller responsive to the indication of the instantaneous level of extraction to control an instantaneous electric hot water heater for heating hot water spaced from the hot water tank before the hot water is dispensed into the brew basket, the hot water having a temperature just before being dispensed into the brew basket, and the controller being responsive to control the instantaneous hot water heater to change the temperature of the hot water just before the hot water is dispensed into the brew basket.

Acquisition of the objective is also accomplished by providing a hot beverage brewer having a source of hot water, a movably mounted brew basket assembly with a brew basket for holding beverage ingredient and a drain hole to dispense beverage, a water dispense system including a brew water dispense valve for selectively passing hot water into the brew basket assembly and though the ingredient, the improvement being a brew basket control system having means for electronically measuring a light characteristic of the beverage as it flows downwardly out of the drain hole and falls freely through air to detect an indication of an instantaneous level of extraction of ingredient into the beverage, said light measuring means being located adjacent the drain hole and above the beverage container and spaced from the brew basket and the beverage container to enable removal of the brew basket without first disconnecting the light measuring means from the brew basket, and a controller responsive to the indication of the instantaneous level of extraction to control at least one of (a) a bypass valve spaced from the brew water dispense valve for passing hot water into the brew basket at a location spaced from and bypassing the ingredient, (b) means to pressurize the brew basket to hasten draining of the beverage from the drain hole, (c) a drain hole closure means and (d) an instantaneous electric hot water heater for heating hot water spaced from the hot water tank before the hot water is dispensed into the brew basket.

Achievement of the objective of the invention is also acquired in part by provision of a hot beverage brewer having a source of hot water, a brew basket assembly for holding beverage ingredient and a drain hole to dispense beverage, a water dispense system for selectively passing hot water into the brew basket assembly, the improvement being a brew basket control system having means for electronically measuring a light characteristic of the beagle as it flows downwardly out of the drain hole to detect an indication of an instantaneous level of extraction of ingredient into the beverage, said light measuring means being located adjacent the drain hole and above the beverage container and a controller responsive to the indication of the instantaneous level of extraction to control a means to pressurize the brew to hasten draining of the beverage from the drain hole.

The objective is also partly obtained by providing a hot beverage brewer having a source of hot water, a brew basket assembly for holding beverage ingredient and a drain hole to dispense beverage, a water dispense system for selectively passing hot water into the brew basket assembly, the improvement being a brew basket control system with means for electronically measuring a light characteristic of the beverage as it flows downwardly out of the drain hole to detect an indication of an instantaneous level of extraction of ingredient into the beverage, said light measuring means being located adjacent the drain hole above the beverage container and a controller responsive to the indication of the instantaneous level of extraction to control the drain hole closure means.

Also, the objective is obtained in part by providing a hot beverage brewer having a source of hot water, a brew basket assembly for holding beverage ingredient and a drain hole to dispense beverage, a water dispense system for selectively passing hot water into the brew basket assembly, the improvement being a brew basket control system, with means for electronically measuring a light characteristic of the beverage as it flows downwardly out of the drain hole to detect an indication of an instantaneous level of extraction of ingredient into the beverage, said light measuring means being located adjacent the drain hole and above the beverage container; and a controller responsive to the indication of the instantaneous level of extraction to control an instantaneous electric hot water heater for heating hot water spaced from the hot water tank before the hot water is dispensed into the brew basket.

BRIEF DESCRIPTION OF THE DRAWING

The foregoing advantageous features and advantages will be described in greater detail and further advantageous features will be made apparent from the detailed description given below with reference to the several figures of the drawing, in which.

DETAILED DESCRIPTION

Figure 1:
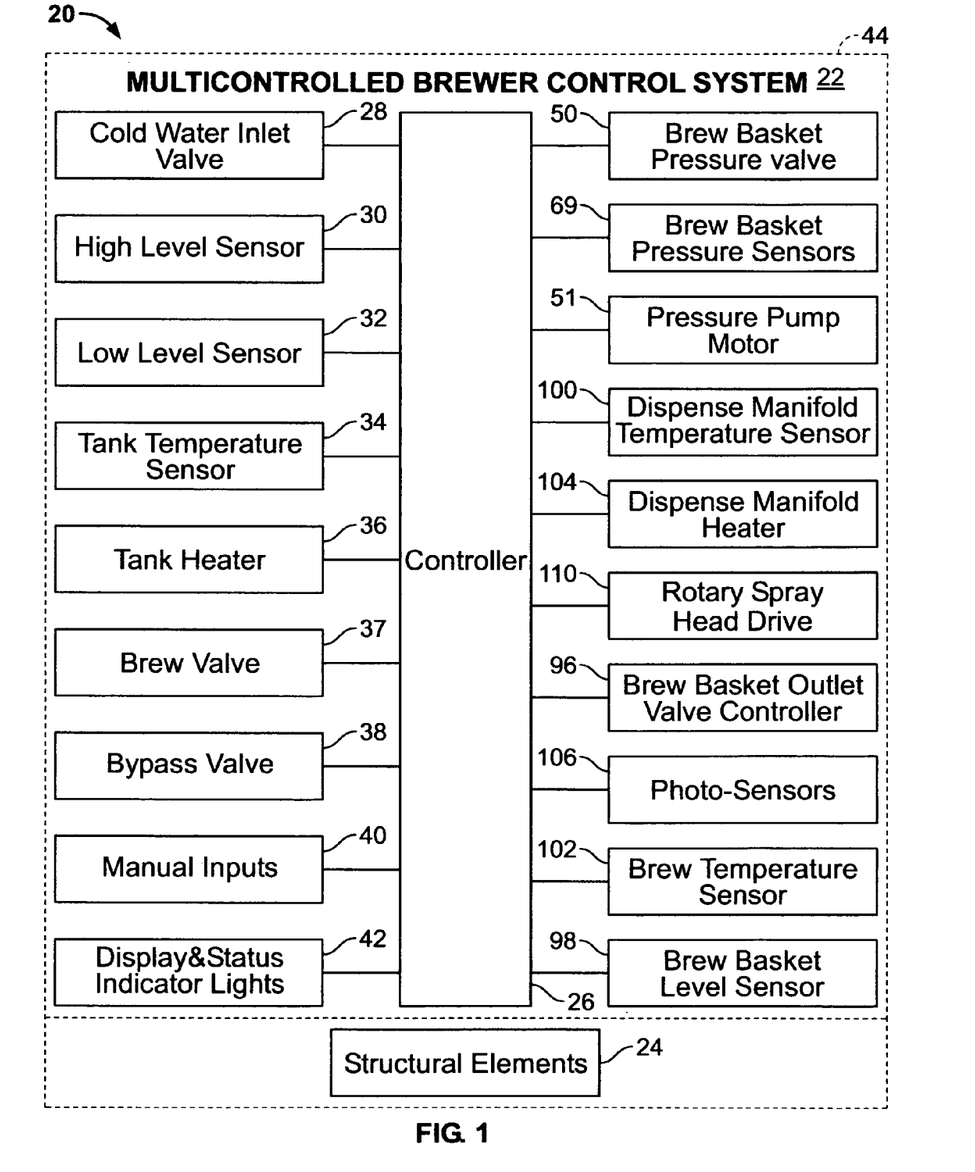
FIG. 1 is a functional block diagram of the control system of the multicontrolled brewer of the present invention.

Referring now to FIG. 1, an embodiment of the multicontrolled brewer 20 of the present invention includes a multicontrolled brewer control system 22 and other structural elements, or mechanical or electromechanical, elements 24. Some of the elements of the structural elements 24 are shown in and are described with reference to FIG. 2.

Some of the elements of the control system 22 are known and, in keeping with the invention, some of the elements are novel. The known elements of the control system 22 include a controller 26 which includes a microcomputer (not shown) with all needed memory to store operating software and sensor data and programmable parameters, etc. (not shown) and all interface circuitry (not shown) needed to interface with the other control elements described below. The computer interfaces with conventional elements, but it novel to the extent that it has been programmed to interface with and sometimes control the novel elements of the control system 22 described below and the novel elements of the brewing system described below with respect to FIG. 2.

Figure 2:
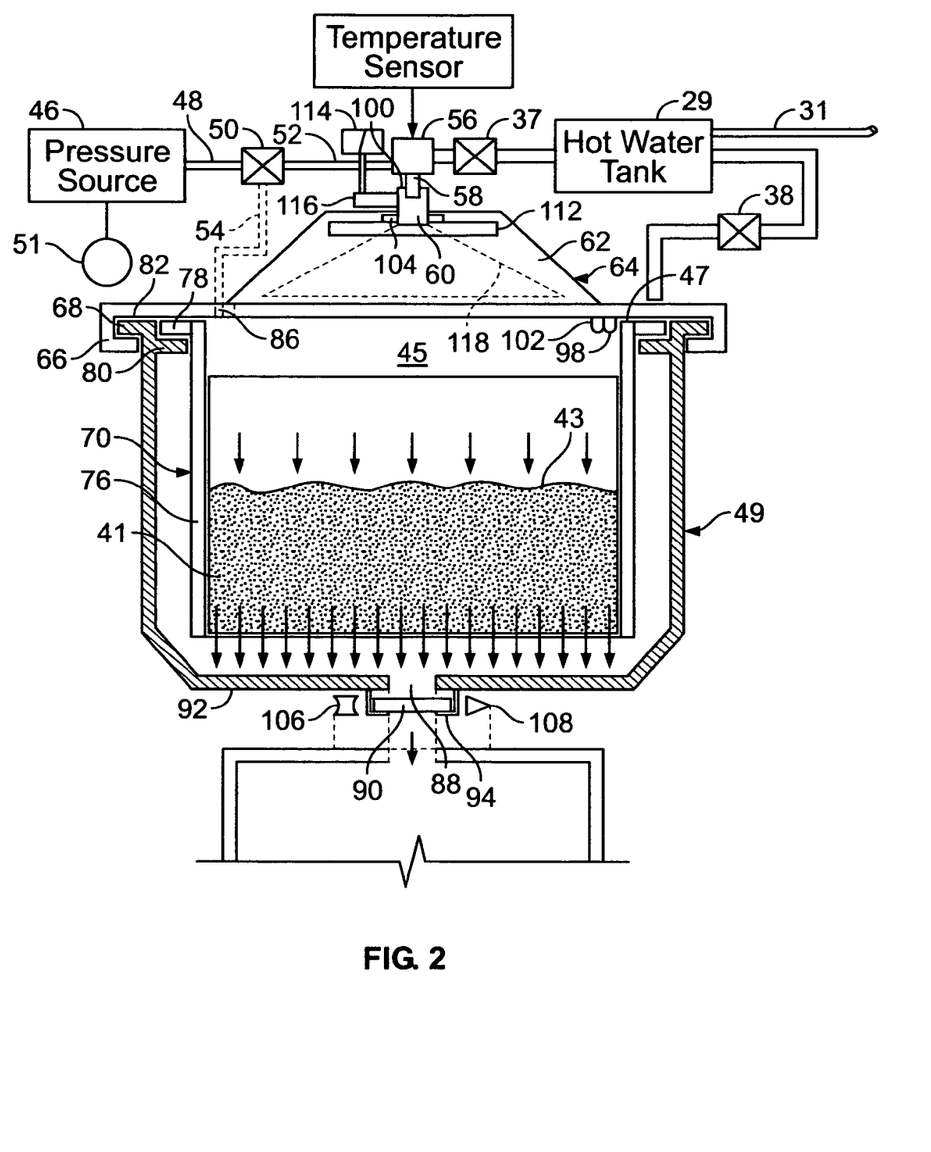
FIG. 2 is a schematic illustration in partial functional block form of one embodiment of the multicontrolled brewer controlled by the control system of FIG. 1 and further illustrating the novel features of the multicontrolled brewer of FIG. 1.

The other known elements of the control system include a solenoid controlled cold water inlet valve 28 for controlling the addition of cold water to the hot water tank 29, FIG. 2, from a source of public water delivered through a hose 31, or the like. The hot water tank 30 has a high level sensor 30 and a low level sensor 32, and the controller responds to these sensors to maintain the level of the water in the hot water tank 30 at a relatively even level between the high level sensor 30 and the low level sensor 32 by selectively closing the valve when the high level is reached and opening the cold water inlet valve when the low level is sensed.

Similarly, the hot water tank 30 has an electrical heating element, or tank heater, 36 that is controlled by the controller 26 in accordance with readings of a hot water tank temperature sensor 34. The temperature is maintained at a level between a preselected maximum and minimum temperature by applying electrical power to the tank heater 36 when the minimum temperature is sensed and withdrawing electrical power when the maximum temperature is reached.

The control system also includes a solenoid controlled brew valve 37 and a by solenoid controlled bypass valve 38 and manual input switches, or manual inputs 40. The manual inputs 40 include a start brew switch that when actuated starts a brew cycle during which the brew valve is selectively opened to pass hot water to a dispense head for delivery of hot water to the top surface of a layer of beverage ingredient, such as ground coffee, contained within a paper or other filter that is supported in a wire mesh filter holder within a brew basket, or brew basket housing, that has a beverage outlet at its bottom to pass freshly brewed beverage to a beverage container such as an insulated beverage dispenser. The bypass valve is located to pass hot water into the brew basket at a location laterally spaced from the filter holding the ingredient but within the brew basket to dilute the beverage with hot water added directly into the beverage container together with the freshly brewed beverage exiting through the filter paper. In conventional brewers the brew basket assembly and dispense head assembly re also conventional. In accordance with the present invention and as described below with respect to FIGS. 2-15, a special dispense head assembly and a special brew basket assembly are provided to improve the brewer performance with respect to uniform saturation and optimum flavor extraction.

The control system also contains an alphanumeric display to enable computer-generated communication with an operator and status indicator lights 42 all contained within a brewer housing 44.

Referring now to FIG. 2, in accordance with the present invention, uniform extractions and optimum flavor extraction depends upon a variety of factors or parameters that must be closely controlled by a variety of different approaches.

In accordance with one aspect of the invention, in order selectively increase the rate at which hot water that has been added to the top of the beverage ingredient layer being supported within the filter and the filter holder of the brew basket migrates, seeps and otherwise passes through the layer of beverage ingredient is controlled by means including a brew basket pressurization system. The pressurization system functions to selectively increase the air pressure in the gap 45 between the top 43 of the beverage layer 41 and the top 47 of the brew basket assembly 49. The brew basket pressurization system includes a pressure source 46, such as provided by an electrically powered, motorized air pump, or pressure pump motor 51 pressurizing a pressure tank. The high-pressure outlet of the 48 is connected to a solenoid controlled pressure valve 50. The pressure valve 50 has at least one or the other of outlets 52 and 54 or both of outlets 52 and 54. Pressure outlet 52 is connected to a manifold 56. The manifold 56 has an outlet 58 in pressure communication with an inlet opening 60 at the top housing 62 of a special dispense head assembly 64. The outlet 54 communicates directly with the open top 47 of the brew basket assembly 49. When the solenoid controlled pressure valve is open, the relatively higher pressure within the pressure source 46 is imparted to the headspace 45. One or more pressure sensors 69, FIG. 1, sense the pressure within one or both of the outlets as fed back to the outlets from the headspace 45, directly within the headspace 45 and within the pressure tank of the pressure source 46. The pressure sensors are monitored by the controller 26 to control the pressure pump motor 51 and thus the pressure in the headspace 45. Because of pressure leakage between the pressure source 50 and the headspace the pressure in the pressure source will generally be higher than the pressure within the space.

Figure 14:
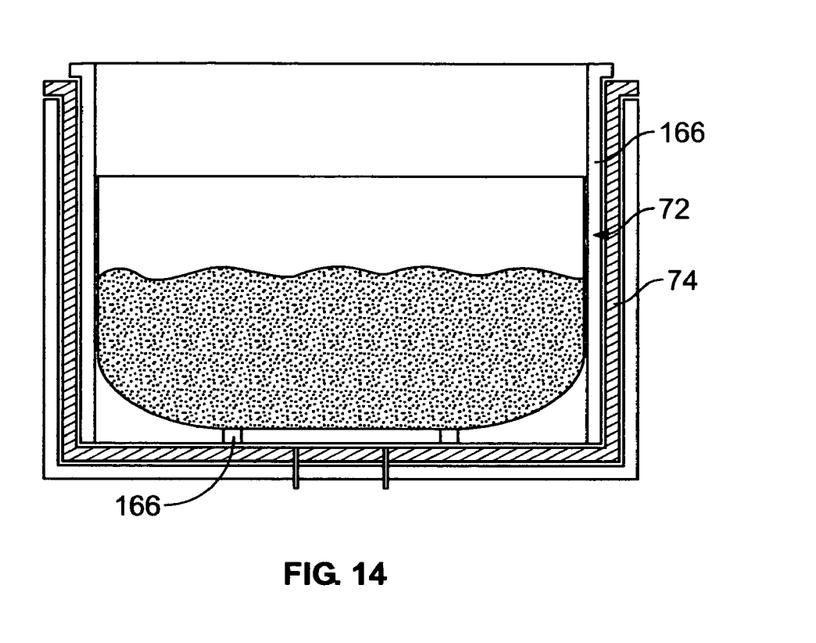
FIG. 14 is a schematic sectional side view a brew basket plastic insert shown inserted into a conventional wire basket filter holder and holding a paper brewed beverage filter containing beverage ingredient such as ground coffee for use in retrofitting a wire filter holder to restrict side flow of beverage through the sides of the filter paper by providing solid sides cylindrical sides.
Figure 15:
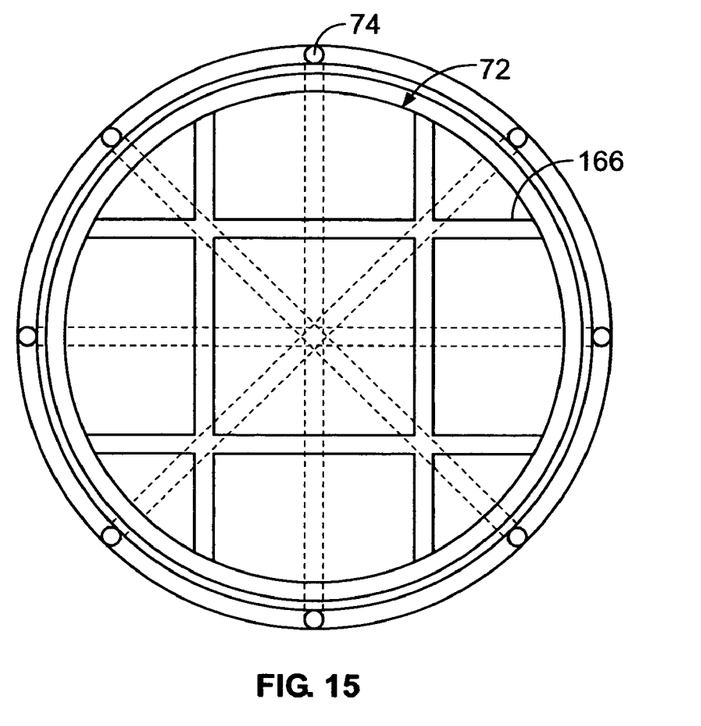
FIG. 15 is a plan view of the brew basket plastic insert assembly of FIG. 14 showing the bottom grid of the insert and the grid supports of the wire basket.

There is at least a partial seal between the pressure source and the headspace 45. The brew basket assembly 49 may have a generally box-like shape and is slideably, releasable mounted to mating support members 66 attached to the underside of the housing 44 by means of a outwardly, laterally extending peripheral collar 68. Preferably, a special filter holder assembly 70, as shown in FIG. 2, or a special filter holder insert assembly 72 inserted within a conventional wire basket filter holder 74, as shown in FIGS. 14 and 15, which has solid, smooth, cylindrical sides made of a suitable plastic or stainless steel.

Referring to FIG. 2, the solid cylindrical side 76 of the filter holder assembly 70 has a mounting collar 78 that is supported on support members 80 that extend inwardly from the inside surface of the brew basket assembly 49. Preferably, the tops of both the mounting collars are pressed against an overlying ceiling member 82 of the housing 44 to provide an at least partially sealed relationship with the bottom of the dispense assembly 64 and the outlet 52 and with the outlet 54 at an outlet port 86 extending through the ceiling member 82.

In accordance with the present invention, at times during the brewing cycle it may be necessary to speed the rate at which the water percolates thought the coffee grounds or the like in order to maximize uniform extraction and optimum flavor. For instance, it may be desired to speed the flow during the later part of dispense period of the brew cycle after more than half of the hot water has passed the brew valve 37 or during the drip period of the brew cycle after all of the water has passed the brew valve 37.

In accordance with another aspect of the invention, brew basket assembly has a bottom with the beverage outlet opening 88 and a brew basket outlet opening closure gate 90 that is carried by the bottom 92 and mounted to the bottom by mounting members 94 for sliding movement between a closed position and an open position. A spring also carried at the bottom 92 resiliently biases the closure gate 90 a closed position, as shown in FIG. 2. A solenoid controlled brew basket valve controller 96 releasable engages the closure gate 90 to move the gate to the open position or allows the gate to remain closed. The purpose of the brew basket closure gate 90 is to enable the operator to allow beverage within the brew basket to selectively accumulate, such as near the end of the dispense cycle. Then after the desired amount or time of accumulation has been achieved the closure gate is again moved to the open position. Opening and closing of the closure gate 90 may be intermittent and the intermittency times of closure may be coordinated with intermittent delivery of hot water to the brew basket assembly. A brew basket level sensor, such as an ultrasonic sensor, 98 may be used by the controller to control the timing of opening and closing of the brew valve 37, the brew bypass valve 38 and the brew basket closure gate 90 either in concert with preprogrammed timed brewing cycles or independently. The pressure system may be used to accelerate discharge of beverage from the brew basket after a period of accumulation either only once at the end or periodically or otherwise intermittently.

Achieving another level of control over temperature or the dispense hot water as well as the temperature of the beverage within the brew basket is achieved respectively with a dispense manifold temperature sensor 100 and a beverage temperature sensor 102. The dispense manifold temperature may be attached directly to the outlet of the manifold 56, FIG. 1, while the brew basket temperature sensor 102 may be a remote infrared temperature sensor. A dispense manifold heater 104 is provided and controlled in accordance with the temperatures sensed by one, the other or both of the temperature sensors 100 and 102. If the temperature as indicated by either of the temperature sensors is less than a reselected minimum temperature, then the controller may energize the heater to provide an instantaneous increase of temperature immediately before the hot water is dispensed into the dispense head in order to maximize uniform abstraction and optimum flavor extraction.

Still one more level of control is obtained over the coffee brewing process by providing photosensor 106 to measure the light transmittance of the beverage as it falls past an infrared light source 108. If desired, the infrared photo sensor may also be used to sense temperature when the light source 108 is turned off. An increase in the amount of light transmittance is an indication of the instantaneous level of extraction that can be used to control the other control elements such as the brew valve 38, the bypass valve 38, the brew basket pressure valve 69 or the brew basket outlet valve controller 96.

Another element that is controlled in accordance with the invention is a rotary dispense head drive 110. Referring to FIG. 2, in one embodiment of the present invention, the dispense water from the manifold outlet 58 is passed into a rotary distribution element. This distribution element may be one or more radial, semi-cylindrical dispense elongate distribution arms 112 with open sides that are upwardly facing. Because the arms are split, tubes instead of closed tubes, they are easy to clean, but closed tubes could also be used. If the dispense distribution arm or arms 112 are in fluid communication with a central dispense receiving hub at which the hot water is received and then distributed at least partly radially outwardly along the length of the arm 112, the jet force of the dispense water being discharged out of the ends or out of radially directed intermediate outlet ports located along the length of the arms 112 can be used to provide the necessary jet stream force to rotate the arms. The relative disadvantage is that the due to liming the ports may become clogged and cleaning of tubular structures relatively difficult compared to cleaning open structures in which all surfaces are readily accessible for cleaning. In the case of either tubes or open cylindrical arms, they may be provided with outlet ports along their length. Preferably, the rotation is controlled by a servo or other motor 114 of the rotary spray head drive 110 that is linked to a drive wheel 116 connected to the outside surface of the hub of the assembly of arm or arms 112. In the case of multiple arms, if there are outlet ports they are staggered such that the discharge from each of the arms falls on the surface 102 of the layer of beverage 41 at different radial distances from the center. In the case of multiple open cylindrical arms without intermediate ports, the dispense water is discharged from the ends of the arms and the arms are preferably of different lengths to provide for distribution on the beverage surface 43 from each arm in circular patterns of different radius to obtain a uniform distribution over the surface 43.

Alternatively, an umbrella-like, distribution plate 118 is employed for rotary distribution of the dispense water along channels running radially outwardly from the central hub and having different lengths that terminate in outlet ports of different radial distances from the central hub. Such "umbrella" distribution plates may be of the type shown in FIGS. 3-8 or as shown in FIGS. 9-13, but adapted for rotation.

Figure 3:
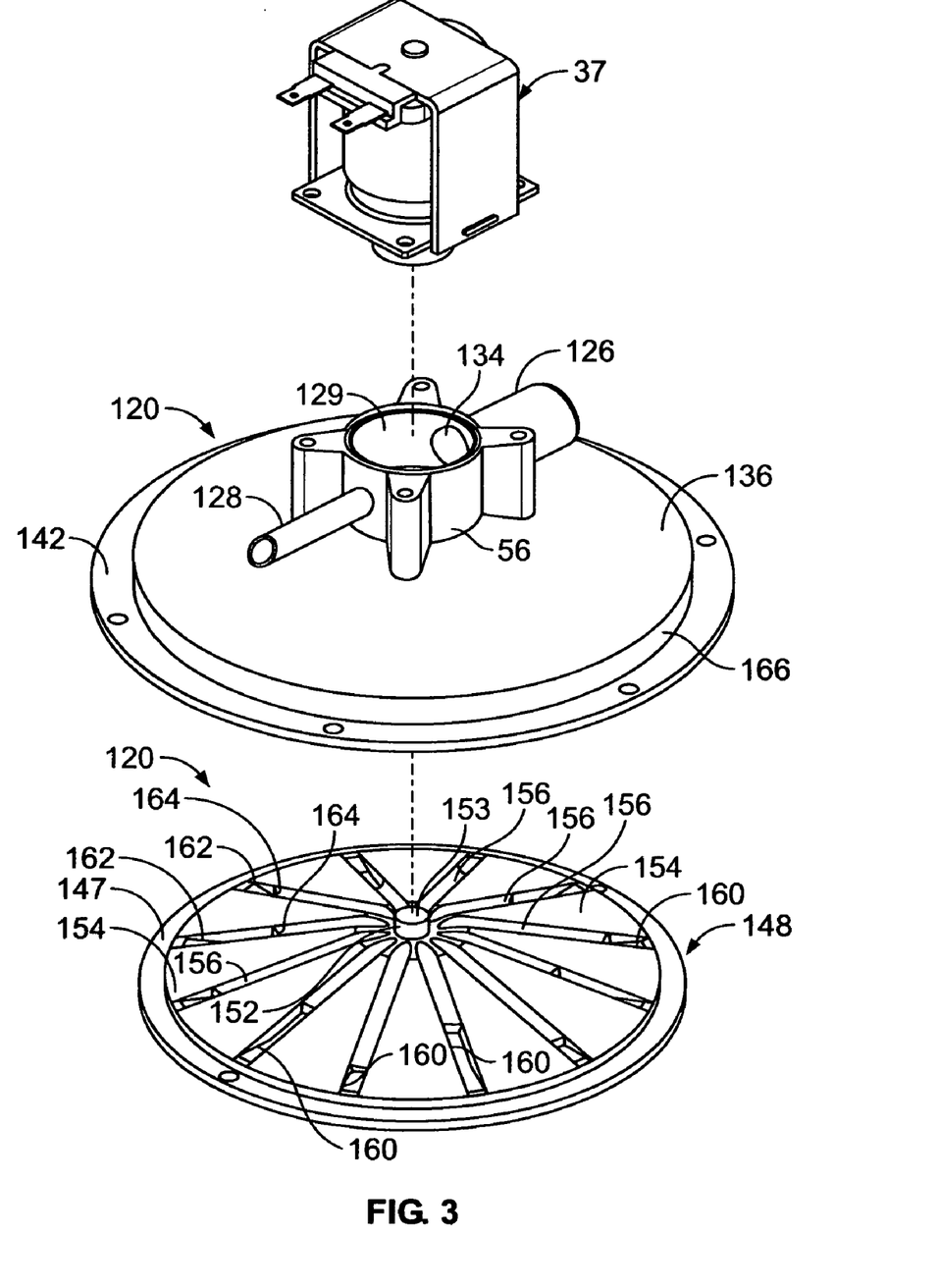
FIG. 3 is an exploded perspective view one form of the hot water dispenser head assembly and brew basket assembly of the present invention.
Figure 4:
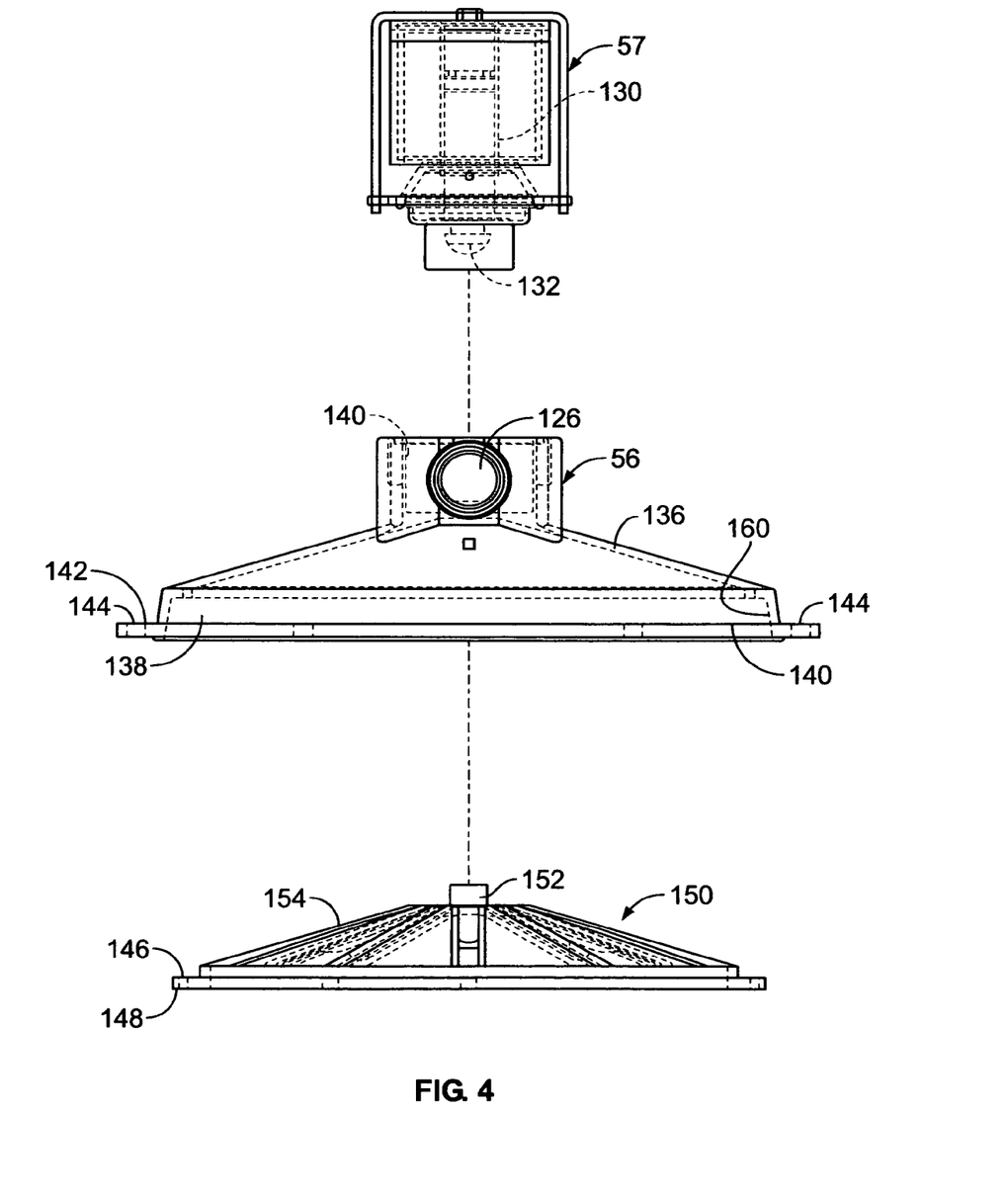
FIG. 4 is a an exploded side view of the hot water dispenser head assembly of FIG. 4.
Figure 5:
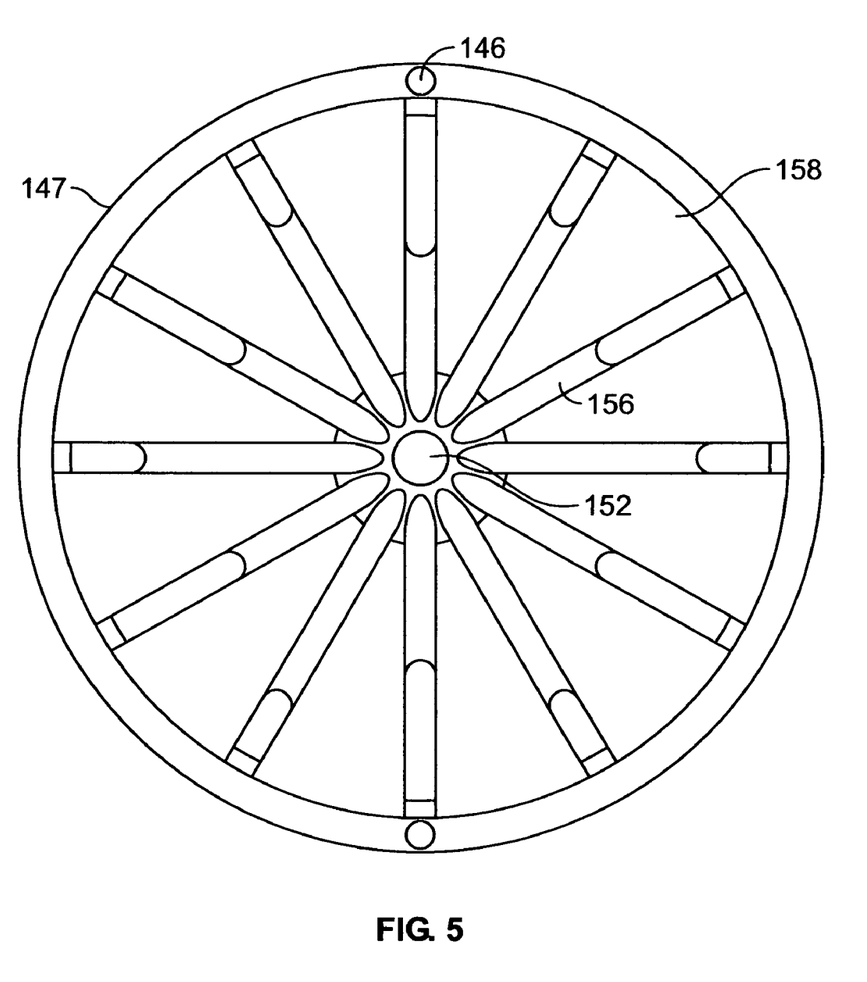
FIG. 5 is a plan view of the novel "umbrella" dispense head of the dispenser head assembly of FIGS. 3 and 4 with a splash distributor that is relatively flat for creating a relatively random distribution of splash that is capable of mounting to the bottom of the dispense housing by screw fasteners or by magnets.
Figure 6:
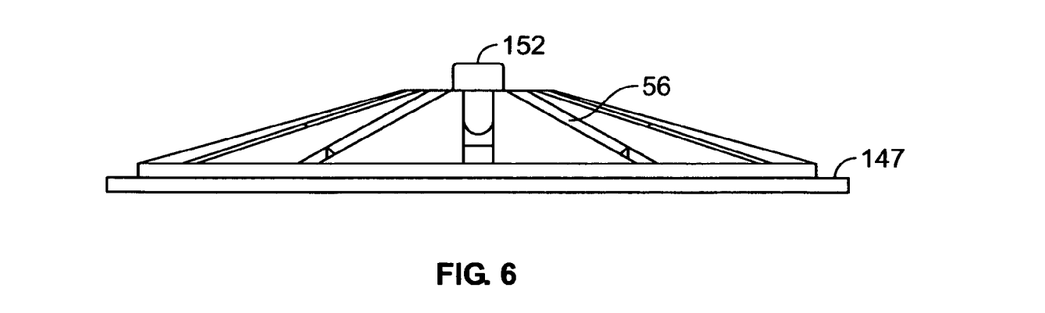
FIG. 6 is a side view of the dispense head of FIG. 5.
Figure 7:
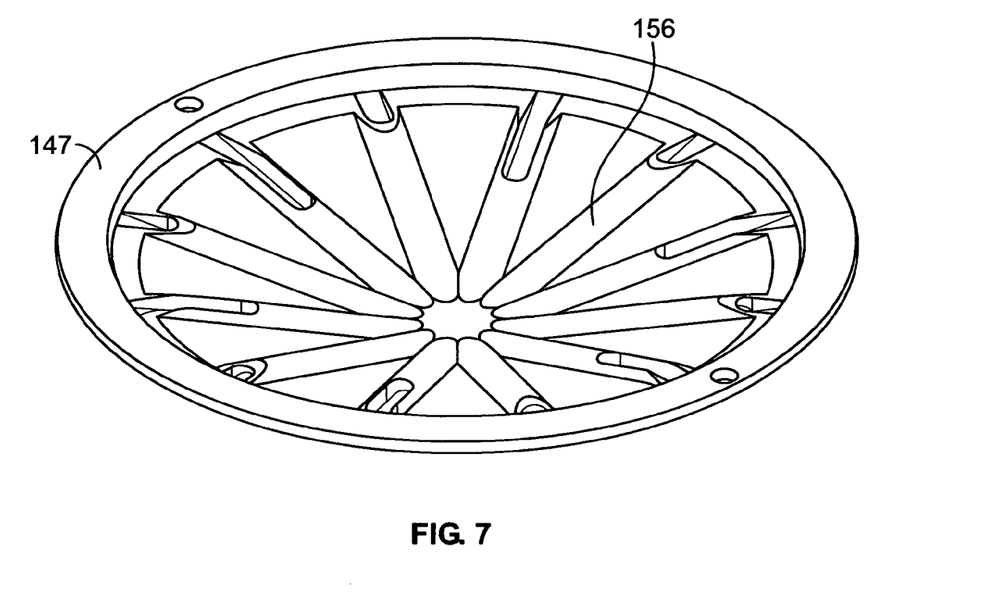
FIG. 7 is a perspective bottom view of the dispense head of FIG. 6.
Figure 8:
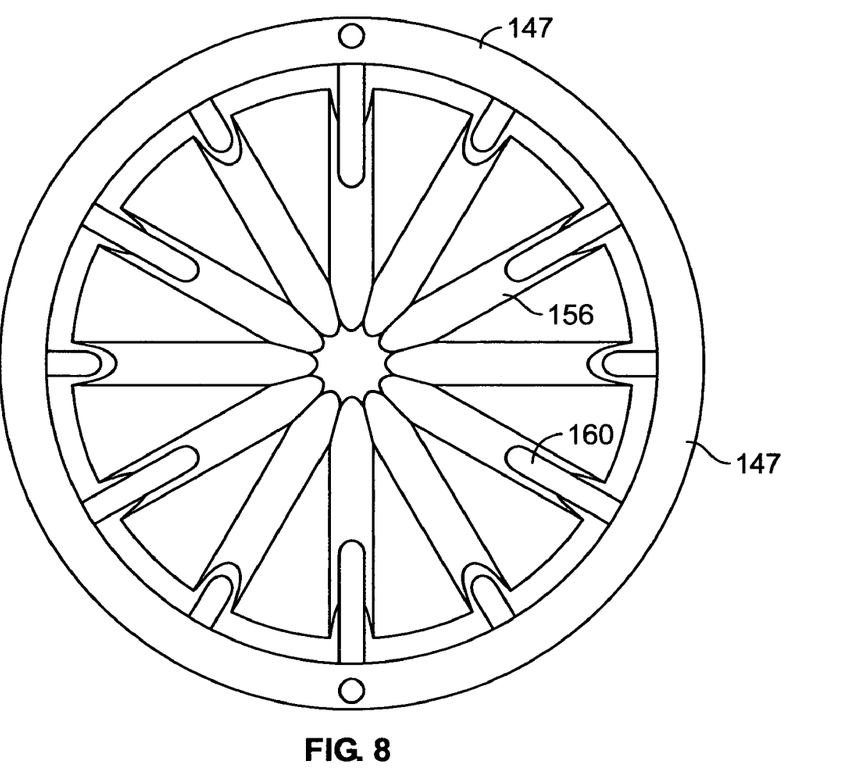
FIG. 8 is a bottom view of the dispense head of FIG. 7.
Figure 9:
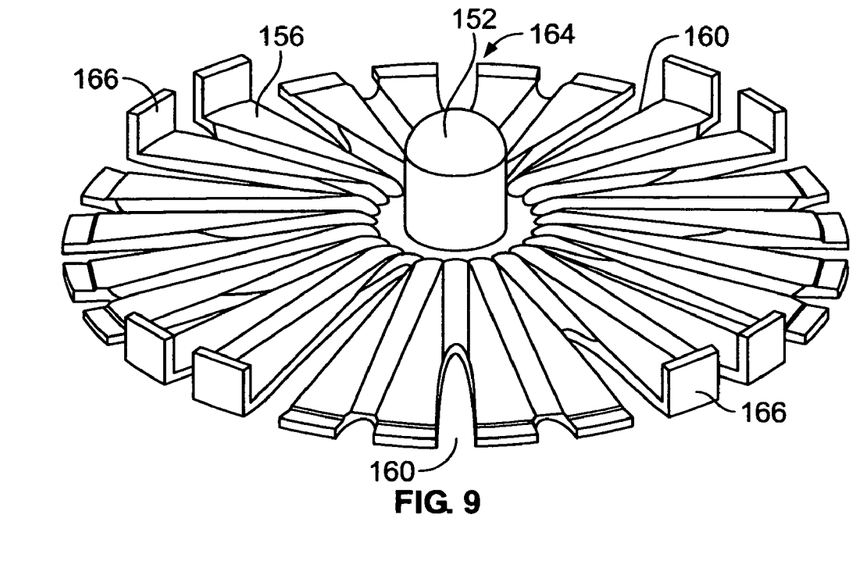
FIG. 9 is a top perspective view of another embodiment of an "umbrella" dispense head like that of FIGS. 5-8 but in which the splash distributor has a domed top and frictional mounting tabs have been added to enable releasable, frictional mounting of the dispense head to the bottom of the dispense housing.
Figure 10:
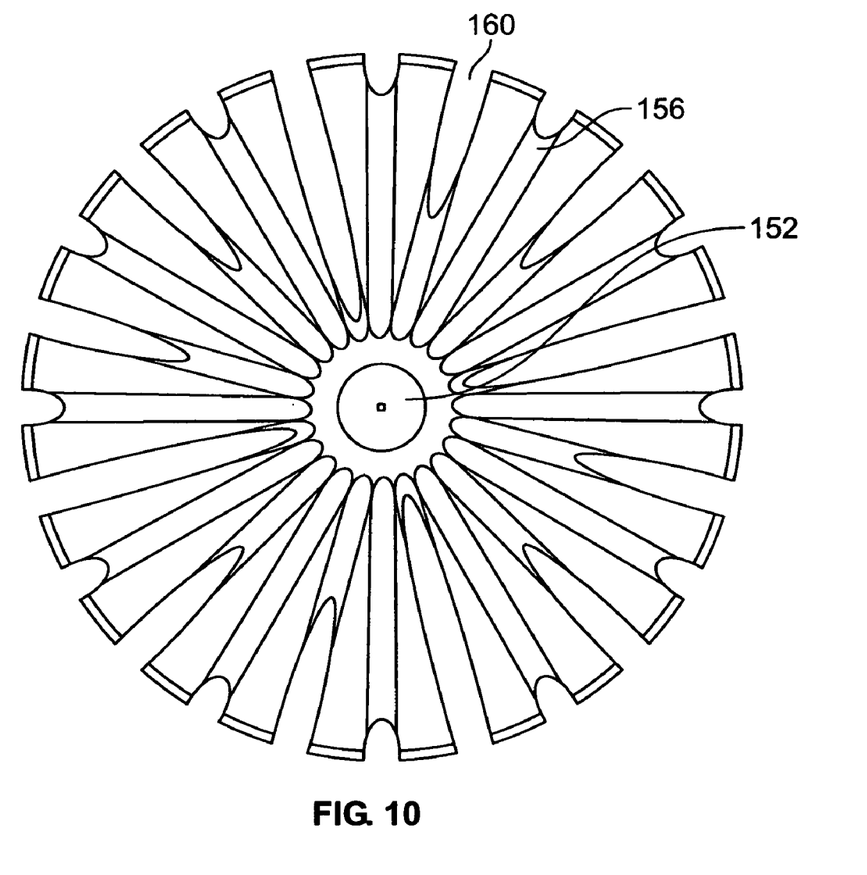
FIG. 10 is a plan view of the dispense head of FIG. 9.
Figure 11:
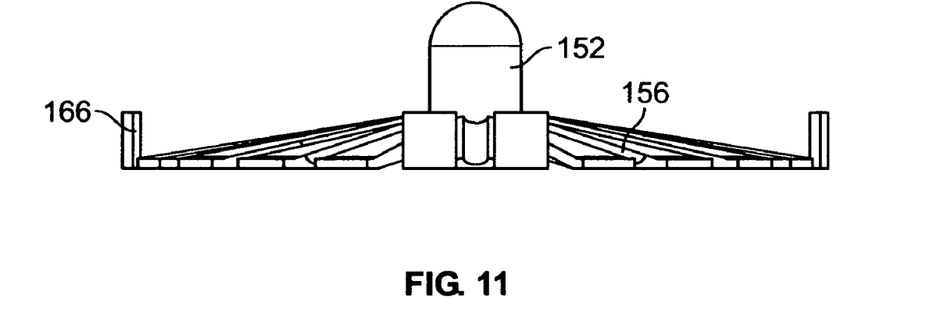
FIG. 11 is a side view of the dispense head of FIG. 11.
Figure 12:
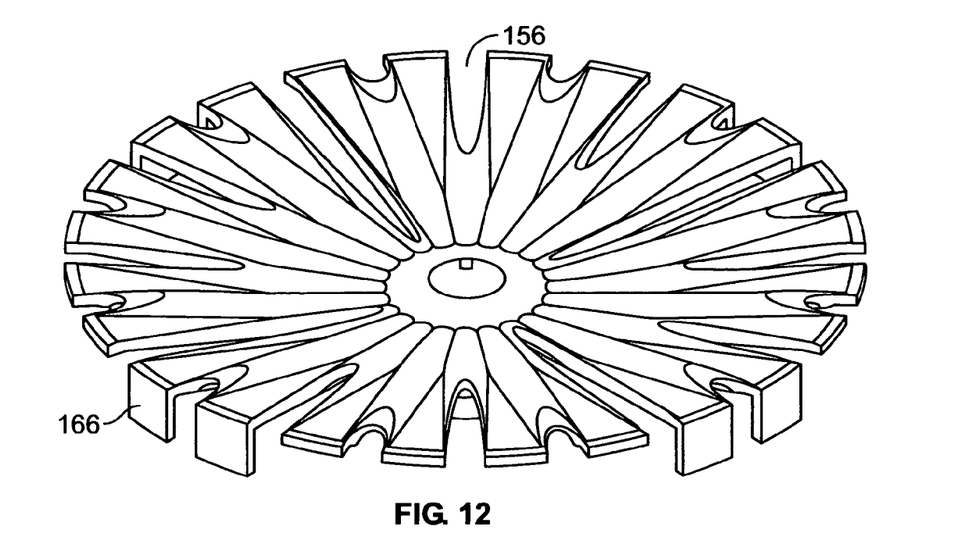
FIG. 12 is a perspective bottom view of the dispense head of FIGS. 9-11.
Figure 13:
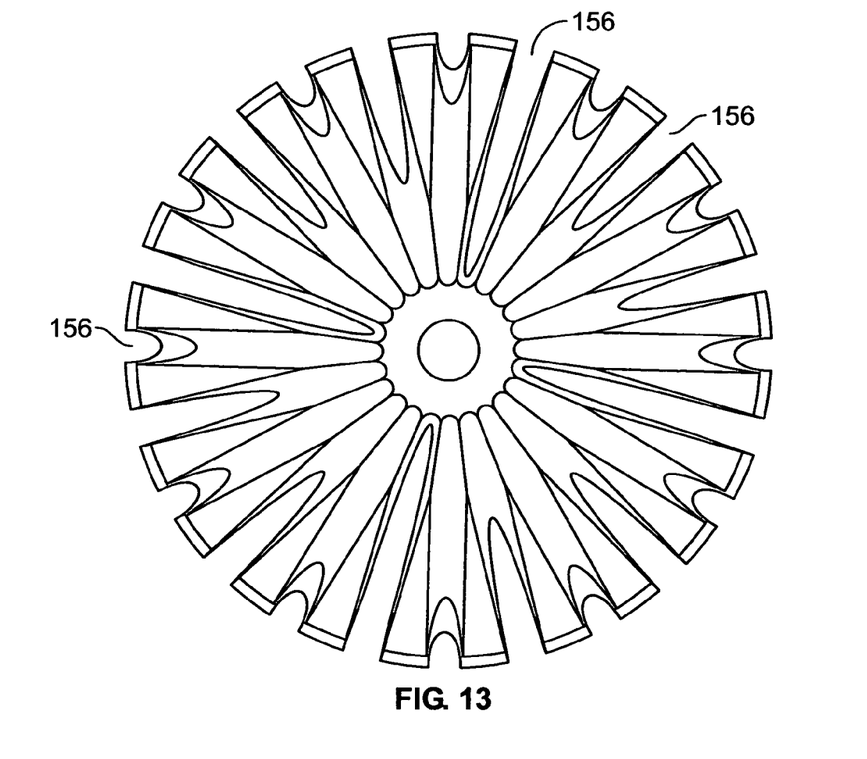
FIG. 13 is a bottom projection view of the dispense head of FIGS. 9-12.

Referring now to FIGS. 3-8, in accordance with one feature of the invention a non-rotary dispense head is shown that is preferably used with the other novel elements of the invention but which may be used independently to improve uniform distributions and optimum flavor extraction by uniform distribution of dispense water across the entire surface 43 of the layer of beverage 41. Referring first to FIG. 3, this embodiment of the dispense head assembly 120 has a stationary distribution "umbrella" plate 122 and an upper housing 124 with the manifold 56 fixedly attached to the top of the upper housing 124. The manifold 56 has a boss that has a side inlet 126 that connects to the hot water tank 29 through the brew valve 37 and preferably, when the pressure source is used, another inlet 128 connecting the inlet to the pressure source 46. An upwardly facing opening 129 in communication with the inlet pipes 126 and 128 interconnects with the solenoid controlled brew valve 37. As seen in FIG. 4, the brew valve has an arm 130 having a distal end with a blocking member 132 that enters the upwardly facing opening 129 to block closed the inlet opening 134 within the interior surface of the boss 56 to block the entry of brew water into the boss 56 when the solenoid controlled brew valve is not energized. When not blocked, the hot water enters the interior of the manifold at which may also be received relatively pressurized air from inlet 128 when the pressure valve 50 is opened. The boss 56 is mounted to the top surface 136 of the upper housing 138 and communicates with the open bottom 140 through an axial central passageway 140 within which is also received the valve blocking member 132.

The upper housing 138 has a distribution plate mounting collar 142 that either carries a plurality of fastener openings 144 that align with mating fastener openings 146 of a mounting collar 147 of the distribution plate 148 of the distribution plate 150 for receipt of threaded fasteners for attachment of the distribution plate. 150. Alternatively, one of the collar 144 and the collar 147 is formed of, or carries, a permanent magnetic material and the other is formed of ferromagnetic material for attachment by magnetic force. The distribution plate 148 has a flat-topped central splash core 152 with a flat top 153. When the dispense water impinges the flat-topped splash core, the water is splashed and randomly distributed across the conical face 154 of the distribution plate 148 and is received within a plurality of radially extending distribution channels, or upwardly facing, radially extending, elongate grooves, 156 formed in the upper surface of the conical face 154. At selected different radial distances from the central core of each of the radial distribution channels is a discharge opening 160. All of the discharge openings 160 have a radially, distal end 162 that is adjacent the opening for passing hot water to the beverage ingredient. However, the inner ends 164 of each of the openings 160. Thus, some of the hot water that is passed through the discharge openings and impinges on the surface 43 lands on the surface 43 at different locations spaced from the center. Additional views of the distribution plate are shown in FIGS. 5-8.

Referring now to FIGS. 9-13, another distribution plate 164 is shown in which instead of use of magnetic or screw fasteners, frictional engagement of resilient tabs 166 are used to resiliently press against an inner surface of the wall 166 of the dispenser housing 136, FIGS. 3 and 4. In addition, instead of the flat top 153, the central splash core has a semi-spherical, or otherwise curved or domed surface, for a less random distributions of dispense water across the upwardly facing surfaces of the distribution plate 164.

Referring now to FIGS. 14 and 15, a cylindrical plastic insert 72 is shown with a mesh bottom 166 for retrofit applications in which only a wire basket filter holder is provide. While a permanent filter holder as described above may be made of stainless steel, the insert may be made of plastic and be disposable. The insert, in all other structural ways may be similar to the permanent cylindrical, opened, meshed bottomed filter holder described above with respect to FIGS. 1 and 2.

While the brew valve is shown as being on the hot water side of the system, it may also be place on the cold-water side with a siphon system that pushes hot water out of the hot water tank when fresh cold water is inserted. In such a system, the amount of water inserted may be passed through a meter that measures directly the amount of water that is added, and thus, discharged from the hot water tank.

Other changes and variations will appear to those skilled in the art to which the subject invention pertains. Reference should be made to the following patents or patent applications for details of known features or details of features that may be used in combination with the novel features of the present invention, all of which are hereby incorporated by reference.

Reference should be made to U.S. Pat. Nos. 6,148,717 and 6,571,685 for details of intermittent brewing in which the brew valve is repetitively controlled to open and close during the dispense period of a brew cycle or in which accumulation of beverage in the brew basket is controlled.

Reference should be made to allowed application Ser. No. 10/030,021, filed Dec. 26, 2002 now U.S. Pat. No. 6,626,085, of the present inventor for "Food Ingredient Grinder, Removable Ingredient Hopper and Method" for details of the closure gate of FIG. 2 and its different possible forms and modes of operation.

Reference should be made to pending U.S. application Ser. No. 10/078,600 filed Feb. 19, 2002 now U.S. Pat. No. 6,845,704, of the present inventor and Michael W. Lassota for "Beverage Making System for details of a system for cold water brew valve operation and flow meter measurement control of delivery of dispense water to the beverage ingredient.

All of these referenced patents are incorporated by reference and all may be used in combination with the novel elements and features of the present invention that will be apparent to those of skill in the art of coffee brewing equipment and systems. To the extent that the details of the parameters that are needed for uniform abstraction and optimum flavor are not disclosed, it should be appreciated that the present invention provides multiple means for enabling maximum uniform extraction an optimum flavor. It should first be appreciated that while maximum uniform extraction may be obtained and thus, from an economical point of view, the most beverage, such as coffee with the best average strength is obtained, the question of optimum flavor may be a subjective evaluation. Accordingly, the specific parameters of operation of the various novel modes of control of the brewing process must be determined by experiment, empirical testing and other relatively subtle and hard to define factors. The purpose of the present invention is to provide the ultimately complete control of the brewing process to enable a brewer to be sufficiently flexible in the brewing process.

The invention claimed is:

1. In a hot beverage brewer having a source of hot water, a brew basket assembly for holding beverage ingredient, a water dispense system for selectively passing hot water into the brew basket assembly under control of an electronic controller during a dispense period of a brew cycle, the improvement being a brew basket control system, comprising:

a pressure source;

means for selectively directly applying positive air pressure from the pressure source to vary the air pressure within the brew basket during the brew cycle; and means including the electronic controller for automatically controlling the application of pressure to the brew basket during the brew cycle by the selectively applying means to selectively vary the rate of seepage of hot water through a layer of beverage ingredient within the brew basket during the brew cycle.

2. The hot beverage brewer of claim 1 in which the controlling means includes means for sensing pressure within the brew basket during the brew cycle, and in which the electronic controller includes means responsive to the pressure sensing means for automatically controlling the application of pressure to the brew basket by the selectively applying means during the brew cycle.

3. The hot beverage brewer of claim 2 in which the pressure sensing means senses the pressure during the brew cycle at least one of (a) an outlet from the pressure source when in pressure communication with the brew basket; (b) an outlet from the pressure source when in pressure communication with the brew basket; (c) a solenoid controlled valve when in pressure communication with the brew basket; and (d) the brew basket.

4. The hot beverage brewer of claim 1 in which the brew basket assembly has a bottom with a beverage drain hole, or opening, and including a closure gate carried by the bottom and mounted to the bottom by mounting members for sliding movement between a closed position and an open position.

5. The hot beverage brewer of claim 4 including
electronic means for sensing the level of beverage, and
means within the controller responsive to the level sensing means to control the timing of opening and closing of at least one of (a) a hot water dispense valve, (b) a brew bypass valve and (c) the brew basket closure gate.

6. The hot beverage brewer of claim 5 in which the control of elements (a), (b) and (c) is in concert with preprogrammed brewing cycles and the application of pressure to the brew basket assembly by the selectively applying means.

7. The hot beverage brewer of claim 6 in which the controlling means controls the selectively applying means to apply pressure to the brew basket assembly to accelerate discharge rate of beverage from the brew basket one of (a) once after a single period of accumulation, (b) periodically after a plurality of periods of accumulation, and (c) otherwise intermittently.

8. In a hot beverage brewer having a source of hot water, a brew basket assembly for holding beverage ingredient, a water dispense system for selectively passing hot water into the brew basket assembly under control of an electronic controller, the improvement being a brew basket control system, comprising:
a pressure source;
means for selectively applying positive air pressure from the pressure source to the brew basket, the selectively applying means including
a special dispense head assembly with a manifold with an inlet and an outlet that communicates directly with an open top brew basket assembly, and
a solenoid controlled pressure valve with at least one outlet in pressure communication with the brew basket assembly; and
means for controlling the application of pressure to the brew basket by the selectively applying means to control the rate of seepage of hot water through a layer of beverage ingredient within the brew basket.

9. The hot beverage brewer of claim 8 in which the controlling means includes at least one pressure sensor for sensing the pressure at the at least one outlet that is fed back from head space above the beverage within the brew basket assembly.

10. The hot beverage brewer of claim 1 in which
the pressure source includes an electrically powered pneumatic pump, and
the controlling means includes means for controlling the application of power to the pneumatic pump.

11. In a hot beverage brewer having a source of hot water, a brew basket assembly for holding beverage ingredient, a water dispense system for selectively passing hot water into the brew basket assembly under control of an electronic controller, the improvement being a brew basket control system, comprising:
a pressure source including an electrically powered pneumatic pump a pressure tank that is pressurized by the pneumatic pump;
means for selectively applying positive air pressure from the pressure source to the brew basket; and
means for controlling the application of pressure to the brew basket by the selectively applying means, including means for controlling the application of power to the pneumatic pump and a pressure sensor for sensing the pressure in the pressure tank, to control the rate of seepage of hot water through a layer of beverage ingredient within the brew basket, said pressure in the pressure tank being less than the pressure in the brew basket due to leakage between the brew basket assembly and the pressure tank.

12. The hot beverage brewer of claim 11 including means to create a partially airtight seal between the pressure source and headspace within the brew basket assembly.

13. The hot beverage brewer of claim 12 including
a housing with an underside, and in which
said seal creating means includes means carried by the underside has an encircling mounting member that has a size and configuration that matches a mating mounting member carried by the brew basket assembly and surrounding an upwardly facing opening of the brew basket assembly, and
said mating mounting means carried by the brew basket assembly releasably attaching the brew basket assembly to the encircling mating edge in abutting, sealed relationship.

14. The hot beverage brewer of claim 13 in which the pressure source that has an outlet at the underside of the housing and laterally located within the encircling mating member.

15. The hot beverage brewer of claim 14 including a resilient seal member carried by at least one of the encircling mounting member of the housing and the mating mounting member of the brew basket.

16. In a hot beverage brewer having a source of hot water, a brew basket assembly for holding beverage ingredient, a water dispense system for selectively passing hot water into the brew basket assembly under control of an electronic controller, the improvement being a brew basket control system, comprising:
a pressure source;
means for selectively applying positive air pressure from the pressure source to the brew basket; and
means for controlling the application of pressure to the brew basket by the selectively applying means to control the rate of seepage of hot water through a layer of beverage ingredient within the brew basket, the controlling means including means for timing the brew cycle and selectively applying pressure to the brew basket assembly at preselected times during the brewing cycle to speed the rate at which the water percolates though the beverage ingredient during preselected time periods during the brew cycle in order to maximize uniform extraction and optimum flavor.

17. The hot beverage brewer of claim 16 in which the controlling means includes a microprocessor controller that is programmed to speed the flow during a latter part of a dispense period of the brew cycle after more than half of the hot water to be added to the brew basket has passed the a hot water dispense valve.

18. The hot beverage brewer of claim 16 in which the controlling means is programmed to increase the pressure within the brew basket assembly a drip period of a brew cycle after all of the water has passed into the brew basket but before it has all passed out of the brew basket assembly.

19. In a hot beverage brewer having a source of hot water, a brew basket assembly for holding beverage ingredient, a water dispense system for selectively passing hot water into the brew basket assembly under control of an electronic controller, the improvement being a brew basket control system, comprising:
a pressure source;
means for selectively applying positive air pressure from the pressure source to the brew basket;

means for controlling the application of pressure to the brew basket by the selectively applying means to control the rate of seepage of hot water through a layer of beverage ingredient within the brew basket, and in which said brew basket assembly has
- a bottom with a beverage drain hole,
- a closure gate carried by the bottom and mounted to the bottom by mounting members for sliding movement between a closed position and an open position,
- a spring carried by the bottom of the brew basket assembly to resiliently bias the closure gate to a closed position, and
- a solenoid controlled brew basket valve controller for selectively engaging the closure gate to move the gate to the open position or to allow the gate to remain closed, said solenoid controlled closure gate being controlled by the controlling means in coordination with control of the application of pressure to achieve different preselected beverage flow rates during different preselected times during a brew cycle.

20. The hot beverage brewer of claim 19 in which the controlling means include a microcomputer that is programmed to close the drain hole closure gate to enable beverage within the brew basket assembly to accumulate at a time close to an end of a dispense period at the end of a brew cycle for a preselected time period.

21. The hot beverage dispenser of claim 20 in which the controlling means controls the opening and closing of the closure gate on an intermittent basis during the dispense period in coordinated, synchronized relationship with intermittent delivery of hot water to the brew basket assembly.

22. In a hot beverage brewer having a source of hot water, a brew basket assembly for holding beverage ingredient, a water dispense system for selectively passing hot water into the brew basket assembly with a beverage drain hole under control of an electronic controller, the improvement being a brew basket flow rate control system, comprising:
- means for selectively closing the beverage drain hole to accumulate beverage within the brew basket assembly during preselected time periods of a brew cycle to reduce the rate of flow of beverage from the drain hole;
- means for selectively increasing positive air pressure to the brew basket assembly during some preselected time periods of the brew cycle to increase the rate of beverage flow from the brew basket assembly drain hole to a first level during the preselected time periods; and
- means for selectively terminating application of positive air pressure to the brew basket during other preselected time periods of the brew cycle to decrease the rate of beverage flow from the brew basket assembly drain hole to a second level less than the first level during the other preselected time periods.

23. In a hot beverage brewer having a source of hot water, a movably mounted brew basket assembly with a brew basket for holding beverage ingredient and a drain hole to dispense beverage into a beverage container, a water dispense system for selectively passing hot water into the brew basket assembly, the improvement being a brew basket control system, comprising:
- means for electronically measuring a light characteristic of the beverage as the beverage flows downwardly out of the drain hole and falls freely through air to detect an indication of an instantaneous level of extraction of ingredient into the beverage prior to being mixed in the beverage container;
  said light measuring means being located adjacent the drain hole and above the beverage container;
  said brew basket being removably mounted to the brewer, and
  said light measuring means being spaced from the brew basket and the beverage container to enable removal of the brew basket without first disconnecting the light measuring means from the brew basket; and
- a controller responsive to the indication of the instantaneous level of extraction to control a hot water brew dispense valve for changing the rate of flow of the hot water onto the ingredient in the brew basket.

24. The hot beverage brewer of claim 23 in which the light characteristic sensing mean is an infrared photo sensor located next to the drain hole and above the beverage container for detecting light transmittance through the beverage as it falls unrestrained through air from the drain hole and before entering the beverage container.

25. The hot beverage brewer of claim 23 in which the light characteristic sensing means includes an infrared photo sensor located adjacent the drain hole and above the beverage container and infrared photo sensor detects both temperature and light transmittance of the beverage falling from the drain hole.

26. A multicontrolled beverage brewer, comprising:
- a hot water tank;
- means for preheating water in the hot water tank;
- means for selectively pressurizing a brew basket during a brew cycle to selectively accelerate the flow rate of hot water from the hot water tank though an ingredient within the brew basket to make the beverage;
- at least one electronic temperature sensor for sensing the temperature of at least one of (a) the temperature of the beverage within the brew basket, and (b) the temperature of the preheated water immediately prior to being added to the brew basket;
- means for selectively instantaneously heating the preheated hot water from the hot water tank immediately before the hot water is dispensed into the brew basket in response to the electronic temperature sensor.

27. A multicontrolled beverage brewer, comprising:
- a brew basket;
- a source of hot water;
- at least one of (a) a brew dispense valve for passing hot water from the source to ingredient within the brew basket, (b) a bypass valve for passing hot water from the source to the brew basket but bypassing the ingredient, and (c) a brew basket drain hole closure at the bottom of the brew basket for draining beverage from the brew basket to a container;
- means for selectively pressurizing the brew basket to selectively accelerate the flow rate of hot water from the source though an ingredient within the brew basket to make the beverage;
- a photosensor sensing a level of light conductance of the beverage before entering the container;
- means for selectively controlling at least one of (a) the brew dispense valve, (b) the bypass valve, and (c) the brew basket drain hole closure in response to the photosensor.

28. A multicontrolled beverage brewer, comprising:
- a brew basket;
- a source of preheated water;
- at least one of (a) a brew dispense valve for passing hot water from the source to ingredient within the brew basket to make the beverage, (b) a bypass valve for passing hot water from the source to the brew basket but bypassing the ingredient, and (c) a brew basket drain hole closure at the bottom of the brew basket for draining beverage from the brew basket to a container;

at least one electronic temperature sensors for sensing the temperature of at least one of (a) the temperature of the beverage within the brew basket, and (b) the temperature of the preheated water immediately prior to being added to the brew basket;

means for selectively instantaneously heating the preheated hot water from a hot water tank immediately before the hot water is dispensed into the brew basket in response to the at least one electronic temperature sensor;

a photosensor for sensing a level of light conductance of the beverage before being passed to the container; and a means for selectively controlling at least one of (a) the brew dispense valve, (b) the bypass valve, and (c) the brew basket drain hole closure in response to the photosensor.

29. The beverage brewer of claim 28 including a brew basket pressurization system for selectively pressurizing the brew basket to selectively accelerate the flow rate of hot water though an ingredient within the brew basket.

30. In a hot beverage brewer having a source of hot water, a brew basket assembly for holding beverage ingredient and a drain hole to dispense beverage into a beverage container, a water dispense system for selectively passing hot water into the brew basket assembly, the improvement being a brew basket control system, comprising:

means for electronically measuring a light characteristic of the beverage as it flows downwardly out of the drain hole to detect an indication of an instantaneous level of extraction of ingredient into the beverage, said light measuring means being located adjacent the drain hole and above the serving container; and a controller responsive to the indication of the instantaneous level of extraction to control at least one of (a) a hot water brew dispense valve, (b) a bypass valve for passing hot water into the brew basket at a location spaced from the ingredient, (c) means to pressurize the brew basket to hasten draining of the beverage from the drain hole, and (d) an instantaneous electric hot water heater for heating hot water spaced from the hot water tank just before the hot water is dispensed into the brew basket; and in which the controller is responsive to the indication of the instantaneous level of extraction to control a drain hole closure means.

31. In a hot beverage brewer having a source of hot water, a brew basket assembly for holding beverage ingredient and a drain hole to dispense beverage, a water dispense system for selectively passing hot water into the brew basket assemble, the improvement being a brew basket control system, comprising:

means for electronically measuring a light characteristic of the beverage as it flows downwardly out of the drain hole to detect an indication of an instantaneous level of extraction of ingredient into the beverage, said light measuring means being located adjacent the drain hole and above the beverage container; and a controller responsive to the indication of the instantaneous level of extraction to control one of (a) a bypass valve for passing hot water into the brew basket at a location spaced from the ingredient, (b) means to pressurize the brew basket to hasten draining of the beverage from the drain hole, (c) a drain hole closure means and (d) an instantaneous electric hot water heater for heating hot water spaced from the hot water tank before the hot water is dispensed into the brew basket, and in which the controller is responsive to control the means to pressurize the brew basket to change the pressure within the brew basket.

32. In a hot beverage brewer having a source of hot water, a brew basket assembly for holding beverage ingredient and a drain hole to dispense beverage, a water dispense system for selectively passing hot water into the brew basket assembly, the improvement being a brew basket control system, comprising:

means for electronically measuring a light characteristic of the beverage as it flows downwardly out of the drain hole to detect an indication of an instantaneous level of extraction of ingredient into the beverage, said light measuring means being located adjacent the drain hole and above the beverage container; and a controller responsive to the indication of the instantaneous level of extraction to control an instantaneous electric hot water heater for heating hot water spaced from the hot water tank before the hot water is dispensed into the brew basket, the hot water having a temperature just before being dispensed into the brew basket, and the controller being responsive to control the instantaneous hot water heater to change the temperature of the hot water just before the hot water is dispensed into the brew basket.

33. In a hot beverage brewer having a source of hot water, a movably mounted brew basket assembly with a brew basket for holding beverage ingredient and a drain hole to dispense beverage, a water dispense system including a brew water dispense valve for selectively passing hot water into the brew basket assembly and though the ingredient, the improvement being a brew basket control system, comprising:

means for electronically measuring a light characteristic of the beverage as it flows downwardly out of the drain hole and falls freely through air to detect an indication of an instantaneous level of extraction of ingredient into the beverage, said light measuring means being located adjacent the drain hole and above the beverage container and spaced from the brew basket and the beverage container to enable removal of the brew basket without first disconnecting the light measuring means from the brew basket; and a controller responsive to the indication of the instantaneous level of extraction to control at least one of (a) a bypass valve spaced from the brew water dispense valve for passing hot water into the brew basket at a location spaced from and bypassing the ingredient, (b) means to pressurize the brew basket to hasten draining of the beverage from the drain hole, (c) a drain hole closure means and (d) an instantaneous electric hot water heater for heating hot water spaced from the hot water tank before the hot water is dispensed into the brew basket.

34. The beverage brewer of claim 33 in which the controller is responsive to control the bypass valve to change the rate of flow of water through the bypass valve.

35. The beverage brewer of claim 33 in which the controller is responsive to the instantaneous level of extraction to control the bypass valve for passing hot water into the brew basket at a location spaced from the ingredient.

36. The beverage brewer of claim 33 in which the controller is responsive to the indication of the instantaneous level of extraction to control the means to pressurize the brew basket to hasten draining of the beverage from the drain hole.

37. In a hot beverage brewer having a source of hot water, a brew basket assembly for holding beverage ingredient and a drain hole to dispense beverage, a water dispense system for selectively passing hot water into the brew basket assembly, the improvement being a brew basket control system, comprising:

means for electronically measuring a light characteristic of the beverage as it flows downwardly out of the drain hole to detect an indication of an instantaneous level of extraction of ingredient into the beverage, said light measuring means being located adjacent the drain hole and above the beverage container; and     a controller responsive to the indication of the instantaneous level of extraction to control the drain hole closure means.

38. In a hot beverage brewer having a source of hot water, a brew basket assembly for holding beverage ingredient and a drain hole to dispense beverage, a water dispense system for selectively passing hot water into the brew basket assembly, the improvement being a brew basket control system, comprising:

means for electronically measuring a light characteristic of the beverage as it flows downwardly out of the drain hole to detect an indication of an instantaneous level of extraction of ingredient into the beverage, said light measuring means being located adjacent the drain hole and above the beverage container; and     a controller responsive to the indication of the instantaneous level of extraction to control an instantaneous electric hot water heater for heating hot water spaced from the hot water tank before the hot water is dispensed into the brew basket.

\* \* \* \* \*